Nov. 25, 1941.　　　T. O. MARTIN　　　2,263,584
METHOD OF MAKING VALVE BODIES
Filed April 3, 1940

Inventor
T. O. Martin.
By Lacey & Lacey, Attorneys

Patented Nov. 25, 1941

2,263,584

UNITED STATES PATENT OFFICE 2,263,584

METHOD OF MAKING VALVE BODIES

Trevellic O. Martin, Jackson, Tenn., assignor of sixty-five per cent to Elmer S. Miller, Jackson, Tenn.

Application April 3, 1940, Serial No. 327,720

1 Claim. (Cl. 29—157.1)

This invention relates to a method of making a valve body, and it is one object of the invention to provide a valve body so formed that the inlet and outlet necks will be strongly reinforced and prevented from cracking when subjected to heavy pressure.

Another object of the invention is to provide a valve body wherein the inlet and outlet necks are reinforced by steel sleeves so mounted therein that they constitute bushings which not only reinforce the necks but have valve seats at their inner ends for engagement by a valve gate.

Another object of the invention is to provide the valve with sleeves which are cast into the necks of the body, the sleeves being cut the proper length and internally threaded and equipped with rings of bearing metal at their inner ends as a preliminary step to forming the valve body of cast metal. It will thus be seen that the reinforcing sleeves may be machined and have the rings of bearing metal applied to them very easily and the finished sleeves then set in place in a mold and molten metal poured into the mold to form a cast metal body having its inlet and outlet sleeves lined by the sleeves which constitute reinforcing bushings for the sleeves and have the valve seats at their inner ends.

Another object of the invention is to provide a method of forming the valve body wherein the pre-formed reinforcing sleeves or bushings are provided with outstanding lugs which are embedded in the necks through which the sleeves extend and serve to firmly anchor the sleeves in their proper positions within the necks.

Another object of the invention is to provide a cast metal valve body wherein the reinforcing sleeves may be formed of steel or other strong metal and the valve seats at their inner ends formed of bronze or other suitable bearing metal according to the use to which the valve is to be put.

Figure 1:
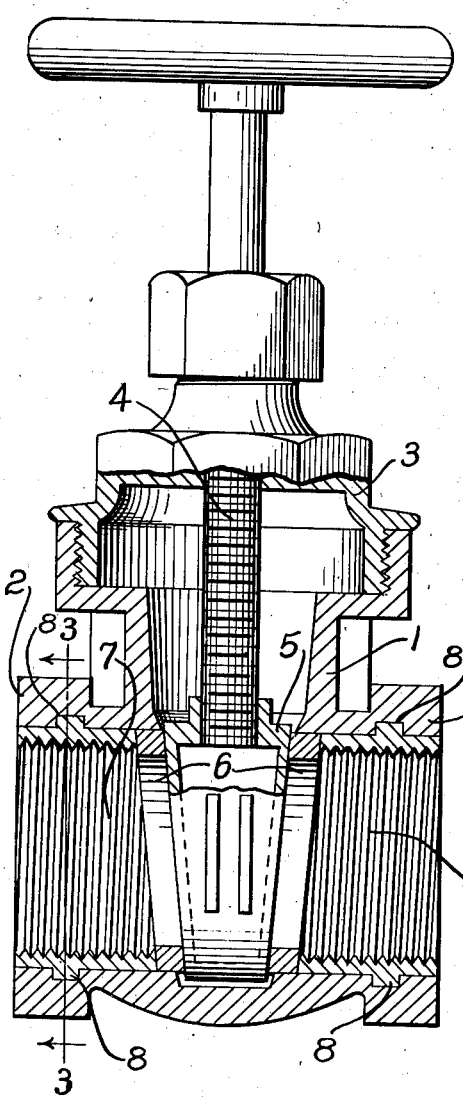
Figure 2:
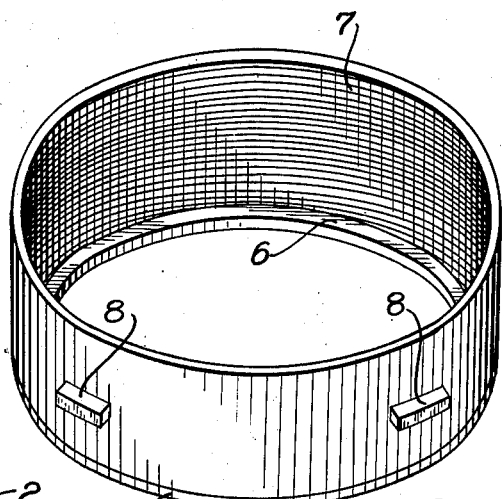
Figure 3:
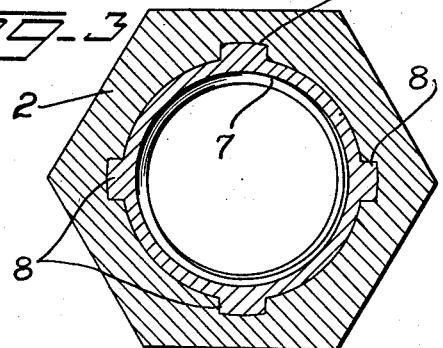

The invention is illustrated in the accompanying drawing, wherein:

Figure 1 is a sectional view taken vertically through a valve of the improved construction, Figure 2 is a perspective view of one of the reinforcing sleeves, and Figure 3 is a sectional view taken transversely through one of the necks along the line 3—3 of Figure 1.

The valve, which is shown in vertical section in Figure 1, has a body 1 having necks 2 at its ends to receive pipe sections when the valve is installed in a pipe line. A bonnet 3 is carried by the valve body and through this bonnet is mounted a valve stem 4 which is threaded and carries a gate 5 which is shifted vertically into and out of a lowered or closed position by turning the valve stem in a predetermined direction. When the gate is shifted downwardly, it has wedging engagement with the valve seats 6 at the inner ends of sleeves 7 which serve as reinforcing bushings for the necks 2 and are internally threaded so that pipe sections may be engaged with the sleeves. It is to be understood that, while the valve has been shown with a gate actuated by a stem which is rotatably mounted through the bonnet and has threaded engagement with the gate to wedge the gate between the valve seats 6, other specific forms of gates and actuating stems may be provided.

The reinforcing bushings 7 are of duplicate construction and each consists of a metal sleeve which may be cut from steel pipe of the proper diameter, it being understood that, while the sleeves are preferably formed of steel, any metal which is sufficiently hard and tough may be used. The sleeves are internally threaded to receive threaded ends of pipe sections, and at points about the circumference of each sleeve, there are provided outstanding lugs 8 which are welded to the sleeve. Four lugs have been shown in Figure 3, but it is to be understood that any number desired may be provided. The inner end of the sleeves may be cut diagonally, as shown, or they may be straight cut according to the type of gate used. After the sleeves have been cut from the metal pipe, the rings 6 of bronze or other suitable bearing metal are applied and welded to their inner ends. These rings have an external diameter corresponding to the external diameter of the sleeves and are of such internal diameter that, when the rings are welded to the inner ends of the sleeves, they form annular valve seats of a thickness greater than the walls of the sleeves and cause the valve seats to project inwardly of the sleeves, as shown in Figures 1 and 3. I have, therefore, provided reinforcing sleeves or bushings which may be easily machined and threaded for engagement with pipe sections and have the lugs 8 and the rings welded thereto. After the rings are prepared, they are mounted in a mold and molten metal poured into the mold and allowed to set and form a cast metal valve body, the necks 2 of which are lined by the sleeves. The necks and adjacent portions of the valve body will be reinforced by the sleeves which are firmly anchored by the lugs 8 and the rings 6 will project from inner ends of the necks for engagement by the gate 5 when the gate is installed in the valve body and moved to a closed position. Since the necks are lined with internally threaded sleeves or bushings, pipe sections may be screwed into the sleeves to mount the valve in a pipe line and since the necks are reinforced by the sleeves, there will be no danger of the cast metal valve body being cracked when subjected to high pressures.

Having thus described the invention, what is claimed as new is:

The method of forming a reinforced valve body comprising cutting sections from a preformed pipe of tough metal of uniform diameter to form sleeves of predetermined length and diameter, the sleeves being each internally threaded throughout its length, welding lugs to the sleeves in spaced relation to each other circumferentially thereof to provide outstanding anchoring members for the sleeves, fusing a ring of bearing metal to one end of each sleeve to form an annular valve seat having its outer annular surface flush with the external surface of the sleeve, placing the prepared sleeves in a mold in spaced relation to each other with their ends carrying valve seats disposed inwardly, and pouring molten metal into the mold to form a cast valve body having pipe line connections lined and reinforced by the sleeves and the valve seats thereof with portions of the cast metal bridging the junctions of the sleeves and the valve seats.

TREVELLIC O. MARTIN.